United States Patent
Bradbury et al.

(10) Patent No.: US 8,126,485 B2
(45) Date of Patent: Feb. 28, 2012

(54) METHOD AND SYSTEMS FOR DYNAMIC ASSIGNMENT OF COMMON SHORT CODES FOR SHARED USE TEXT MESSAGE ROUTING

(75) Inventors: Stanley Jay Bradbury, San Francisco, CA (US); Channagiri Jagadish, Cupertino, CA (US)

(73) Assignee: CRM Text Solutions, Inc., San Francisco, CA (US)

( * ) Notice: Subject to any disclaimer, the term of this patent is extended or adjusted under 35 U.S.C. 154(b) by 471 days.

(21) Appl. No.: 12/367,470

(22) Filed: Feb. 6, 2009

(65) Prior Publication Data

US 2009/0203390 A1    Aug. 13, 2009

Related U.S. Application Data

(60) Provisional application No. 61/027,392, filed on Feb. 8, 2008.

(51) Int. Cl.
*H04W 4/00* (2009.01)
*H04B 1/08* (2006.01)

(52) U.S. Cl. .................. 455/466; 455/564; 455/411

(58) Field of Classification Search .............. 455/435.1, 455/466, 417, 414.1, 564, 41.2, 411; 705/26, 705/5, 26.1, 64; 375/148; 370/335, 328
See application file for complete search history.

(56) References Cited

U.S. PATENT DOCUMENTS

2007/0265006 A1* 11/2007 Washok et al. ............ 455/435.1
2008/0103918 A1*  5/2008 Burnette et al. ................ 705/26

* cited by examiner

*Primary Examiner* — Kiet Doan
(74) *Attorney, Agent, or Firm* — Morrison & Foerster LLP

(57) ABSTRACT

A computer-readable medium encoded with executable instructions for a text messaging service for dynamically associating a first user to a first business via a shared common short code is provided. The instructions are for receiving a first text message from a first user via a first shared common short code, determining a user history associated with the first user based on an identification of the first user, and determining an association of the first shared common short code with a first business based on the user history associated with the first user. The instructions are further for storing the association of the first shared common short code with the first business for the first user in the user history associated with the first user and routing the first text message to the first business.

28 Claims, 7 Drawing Sheets

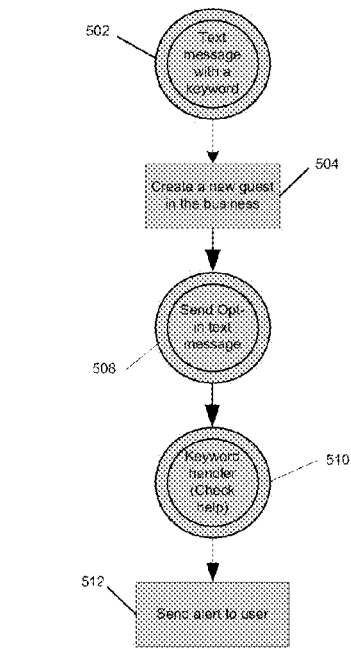
Figure 5A
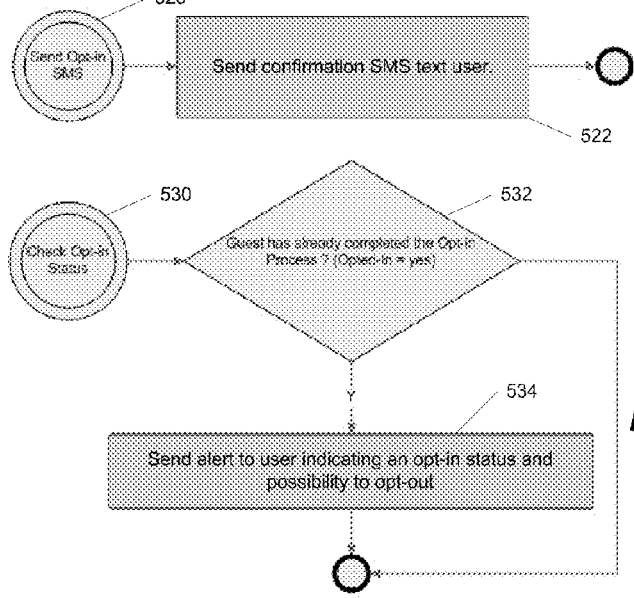
Figure 5B
Figure 5C
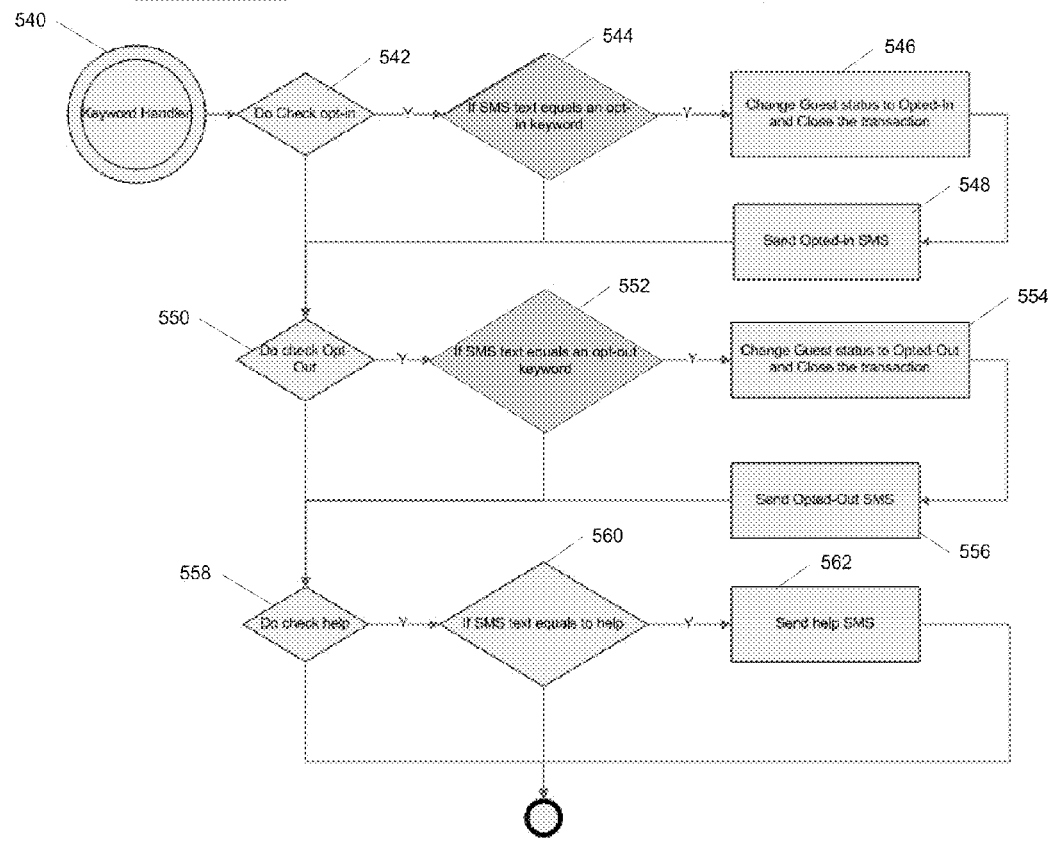
Figure 5D

METHOD AND SYSTEMS FOR DYNAMIC ASSIGNMENT OF COMMON SHORT CODES FOR SHARED USE TEXT MESSAGE ROUTING

CROSS REFERENCE TO RELATED APPLICATIONS

This application claims the benefit under 35 USC 119(e) of prior copending U.S. Provisional Patent Application No. 61/027,392, filed Feb. 8, 2008, the disclosure of which is hereby incorporated by reference in its entirety.

FIELD OF THE INVENTION

The present application relates to wireless communication systems that host Short Message Service (SMS) and Multimedia Message Service (MMS) traffic on their networks, more particularly, to the routing of SMS and MMS messages within a group of Common Short Codes (CSC).

BACKGROUND OF THE INVENTION

Short Message Service (SMS) is a communications protocol using Short Message Peer-to-Peer (SMPP) protocol over TCP/IP networks for the exchange of data with mobile devices. The protocol is defined in GSM recommendation 03.40 "Short Message Service-Point to Point (SMS-PP)" and supported by GSM, ANSI CDMA networks and Digital AMPS. Currently, the two basic forms of data transmission in the protocol are:

a. Short message Mobile Terminated (SMS-MT)/Point-to-Point: the ability of a network to transmit a Short Message to a mobile phone. The message can be sent by phone or by a software application.

b. Short message Mobile Originated (SMS-MO)/Point-to-Point: the ability of a network to transmit a Short Message sent by a mobile phone. The message can be sent to a phone or to a software application.

Multimedia Messaging Service (MMS) is an extension of the SMS standard, developed by the Open Mobile Alliance, allowing longer message lengths and using Wireless Application Protocol (WAP) to display the content including multimedia objects. Multimedia objects include, for example, images, audio, video, and rich text. MMS messages are delivered in a fashion almost identical to SMS. However, in MMS, multimedia content is first encoded and inserted into a text message.

For the purposes of this document, hereafter "SMS" will refer to both SMS and MMS messages and other similar and future extensions of those standards with the same purpose of transmitting data over telecommunications networks via a CSC to mobile devices, including Enhanced Message Service (EMS) and WAP Push protocols.

The entity within the mobile network that delivers SMS messages is the short message service center (SMSC). A mobile originated (MO) SMS sent to the network is received by the SMSC servicing that user, or subscriber. Here, various SMS protocols identify the content and confirm validity of the message. Once the identification and confirming validity is completed, the SMSC attempts to identify the SMSC servicing the intended recipient of the message and then deliver the message to that mobile terminated (MT) subscriber. If the MT subscriber is unavailable, the SMSC will store the message until the subscriber is available, or simply reject the message if the SMSC is well past its memory capacity. An SMS function attempts to deliver a message to a mobile terminal registered on the mobile network even if the intended user is engaged in a voice or data operation on their mobile device.

Currently, millions of users of mobile communications networks exist within the United States. Each individual user is uniquely identified by their mobile telephone number or Automated Number Identification (ANI). This unique identifier allows mobile subscribers to SMS to the correct ANI of their intended recipients.

As mentioned above, the SMS method of communications can also be perpetrated through an internet-based computer through third party software that provides an SMS gateway on a computer. This computer can also be uniquely identified by either assigning the computer an ANI, or assigning the computer a common short code (CSC) through a connection aggregator, which connects the computer to various mobile telecommunications providers.

A CSC is a short string of numbers to which an SMS text message can be addressed or received from. It allows mobile subscribers to access applications on participating networks. Mobile subscribers who wish to receive SMS communications from a company utilizing a CSC must first opt-in to receive those messages, or in other words, give their permission to be contacted. A CSC is used to mass communicate with mobile subscribers to conduct polling or sell ringtones. Generally, CSCs may be used by large companies to conduct direct national marketing.

In order to utilize a CSC, a content provider must obtain connectivity to participating wireless service providers' networks so that a message addressed to their CSC can be routed from the wireless network to their application. The most common method for connecting to a wireless network is Short Message Peer to Peer (SMPP) over a secured Virtual Private Network (VPN) connection.

Marketing companies commonly provide shared-use access to a single CSC through the use of keywords exclusively assigned to businesses. These applications determine the keyword submitted by a subscriber in a MO message sent to a CSC, determine which business has the right to that keyword, and automatically respond with a MT message based on the keyword and message history.

The downfall of utilizing a single CSC for multiple businesses engaged in on-going, two-way customer relationship management is that the content and natural language complexity of these messages cannot be managed by Keywords. One mobile number may opt-in to numerous businesses using the same CSC but there presently exists no method to accurately route more complex, natural language MO messages sent to a CSC to the correct business sharing access of the CSC. For example, one user may opt-in to four retailers in Los Angeles that share access to a single CSC for sending out promotions and coupons and providing customer service. The user sends the MO message "How late are you open today?" to the CSC. There is no way to know 100% for sure which of the four stores the message was intended to reach.

As a possible solution, each business could accomplish guaranteed two-way SMS communications with an internet connected computer and SMS gateway using an individual CSC for each of their locations. However, the cost to license a numeric five or six digit CSC may be $500 per month, for example. The cost to license a mnemonic five or six digit CSC may be $1,000 per month, for example. The cost of hosting a CSC with an aggregator with connections to the carriers may be $1500 per month, for example. For most companies, the cost of licensing and aggregator hosting a CSC is uneconomical. And the number of businesses in the U.S. exceed the number of CSC available (990,000) to license. Thus, it would be impossible for every business to have an individual CSC.

Accordingly, there exists a need to provide a cost effective and efficient method and system to allow the shared use of common short codes that can conduct both MO and MT communications to its local opted-in users.

Thus, providing a software solution that will allow multiple locations to share an assignable group of CSCs in order to conduct MO and MT SMS messaging to users who opt-in to receive those messages is desired.

BRIEF SUMMARY OF THE INVENTION

In accordance with embodiments of the present invention, a computer-readable medium encoded with executable instructions for a text messaging service for dynamically associating a first user to a first business via a shared common short code is provided. The instructions are for receiving a first text message from a first user via a first shared common short code, determining a user history associated with the first user based on an identification of the first user, and determining an association of the first shared common short code with a first business based on the user history associated with the first user. The instructions are further for storing the association of the first shared common short code with the first business for the first user in the user history associated with the first user and routing the first text message to the first business.

Other features and aspects of the invention will become apparent from the following detailed description, taken in conjunction with the accompanying drawings, which illustrate, by way of example, the features in accordance with embodiments of the invention. The summary is not intended to limit the scope of the invention.

BRIEF DESCRIPTION OF THE DRAWINGS

FIG. 5A illustrates a flow diagram of a keyword opt-in process according to embodiments of the invention.

FIG. 5B illustrates a flow diagram of an opt-in process is initiated by the business according to embodiments of the invention;

FIG. 5C illustrates a flow diagram of a confirmation of an opt-in process according to embodiments of the invention;

FIG. 5D illustrates a flow diagram of determining how to opt-in or opt-out users based on keywords and the user's status according to embodiments of the invention;

In the following description, reference is made to the accompanying drawings which form a part thereof, and which illustrate several embodiments of the present invention. It is understood that other embodiments may be utilized and structural and operational changes may be made without departing from the scope of the present invention. The use of the same reference symbols in different drawings indicates similar or identical items.

DETAILED DESCRIPTION OF THE INVENTION

The following description is presented to enable any person of ordinary skill in the art to make and use the invention. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described and shown.

To accomplish the shared use of short codes, messages need to be routed according to methods implemented in our system. The two parties involved in a text message exchange according to embodiments of the invention are the business (hereinafter "business"), and users, such as a customer or potential customer of the business, who have a mobile device capable of SMS and intend to or have opted-in to receive ongoing messages from the business (hereinafter "user"). For these purposes a user is equivalent to an opted-in mobile phone number if there is a one-to-one correlation between user and mobile phone number.

Therefore, it is possible to have a user be the user of multiple businesses. The business may enter into an agreement with an entity ( the "lessor") that has a controlling interest in a group of Common Short Codes for the rights to send Mobile Terminated (MT) messages to all of the users that have gone through the opt-in process with the business. Thus, the business may receive Mobile Originated (MO) messages from the opted-in users via a group of shared CSCs, which are also in use by a plurality of other businesses.

One user, or one mobile phone number may, over time, opt-in to numerous businesses. The number of times a mobile number may opt-in is hereafter "X." In some embodiments, it is likely X is a whole integer less than 100. The number of CSCs in the assignable CSC group will increase to X+1 so that there is always at least one unassigned CSC to assign to a user if they seek to opt-in to another business. The X+1 CSCs in the assignable CSC group will be enough to serve every single business in the world since the limiting factor is how many businesses a mobile subscriber is actively opted-in to for on-going communications.

Dynamic CSC assignability allows for effective sharing of CSCs among multiple businesses.

Figure 1:
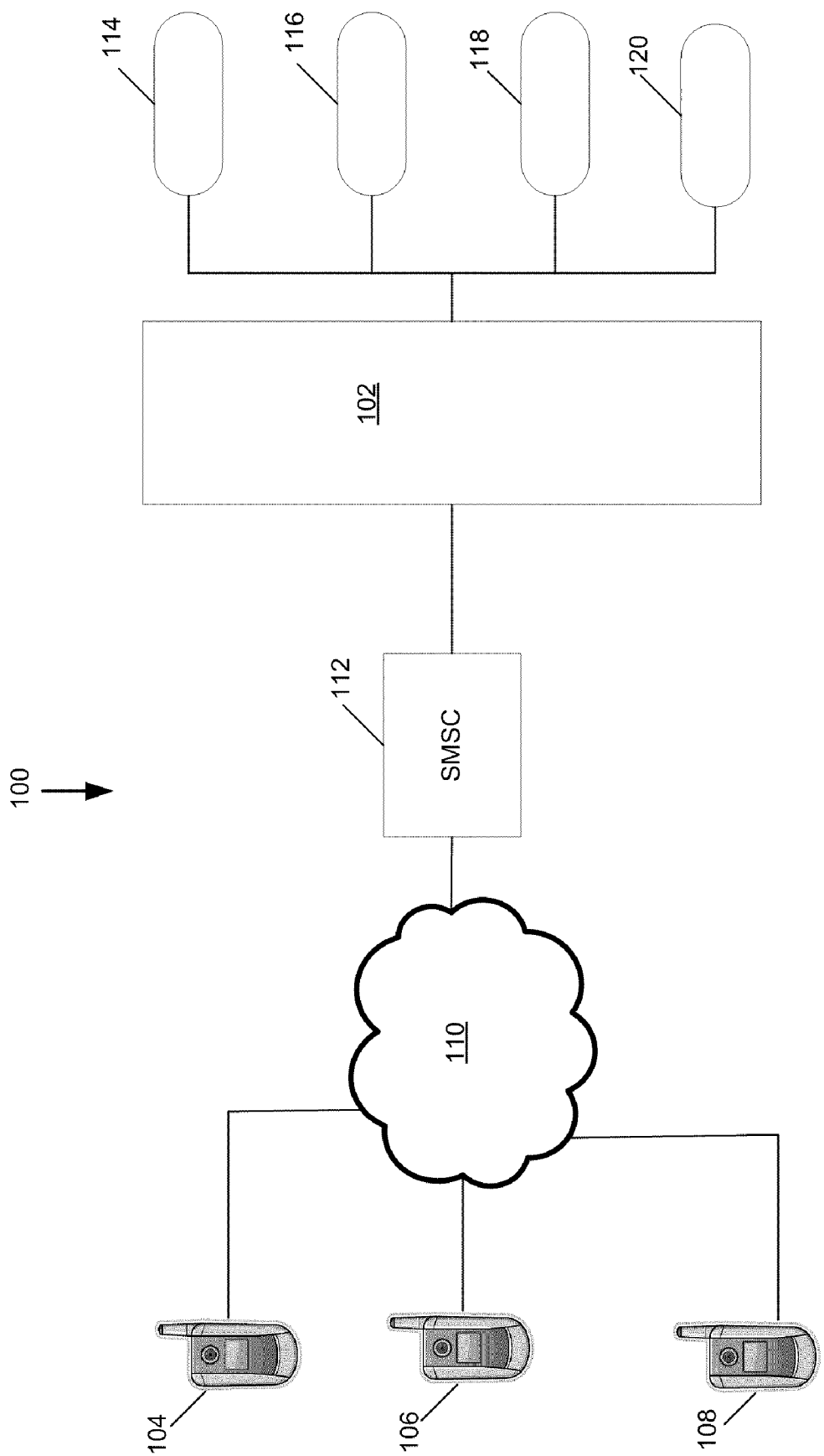
FIG. 1 illustrates a system for associating common short codes to a business for a user according to embodiments of the invention.

FIG. 1 illustrates a system 100 for associating common short codes to a business for a user including a CSC system 102 according to embodiments of the invention. A CSC system 102 communicates with a plurality of businesses 114, 116, 118, and 120 and a plurality of users 104, 106, and 108, for example. The users 104, 106, and 108 communicate with the CSC system 102 via a mobile network 110, such as a GSM/WCDMA network. A Short Message Service Center (SMSC) 112 is a network element in the mobile telephone network which delivers SMS messages and is associated with the CSC system 102.

As an example, user 104 may wish to send and receive messages with business 118. User 104 will send a text message via a CSC. When the text message is received at CSC system 102, the user 104 is identified. The user identification may be the user's mobile telephone number, for example. CSC system 102 will check the user history associated with the user 104 and determine if the CSC has already been associated with a business for the user. If so, CSC system 102 will route the text message to the associated business. If not, the CSC system 102 will determine which business the user is attempting to send the text message. When the destination business is determined, in this example, business 118, the CSC will be assigned to business 118 for the user 104 and stored in the user history of user 104.

Later, user 106 may want to send a text message to business 114. User 106 may use the same CSC user 104 used to text message business 118. However, CSC system 102 will associate business 114 with the CSC and store the association in the user history of user 106.

As described above, embodiments of the invention allow for sharing of an assignable group of CSCs between a plurality of users. Furthermore, the CSCs within the assignable CSC group may be dynamically assigned to users. The CSCs may be assigned by the users or by the businesses in some embodiments.

The assignable CSC group may include marketing CSCs, as well as common CSCs. Marketing CSCs may be provided to businesses to use on the basis of exclusive keywords. While hundreds or thousands of businesses may use the same CSC for marketing, each keyword (which can be any combination of alpha numeric characters and does not have to be a natural language word) is controlled by one business. For instance, according to embodiments of the invention, automotive retailers may all use the marketing CSC 639227 (and/or its vanity equivalent "NEWCAR") in advertising. However, according to embodiments of the invention, automotive businesses may have a unique keyword to opt-in users, such as "PENSKE" or "AUTOMALL." Similarly, as another example, real estate agents may all generally use the marketing CSC 46637 (and/or its vanity equivalent "HOMES") in advertising. However, each real estate agent business may have a unique keyword to opt-in users.

Figure 2:
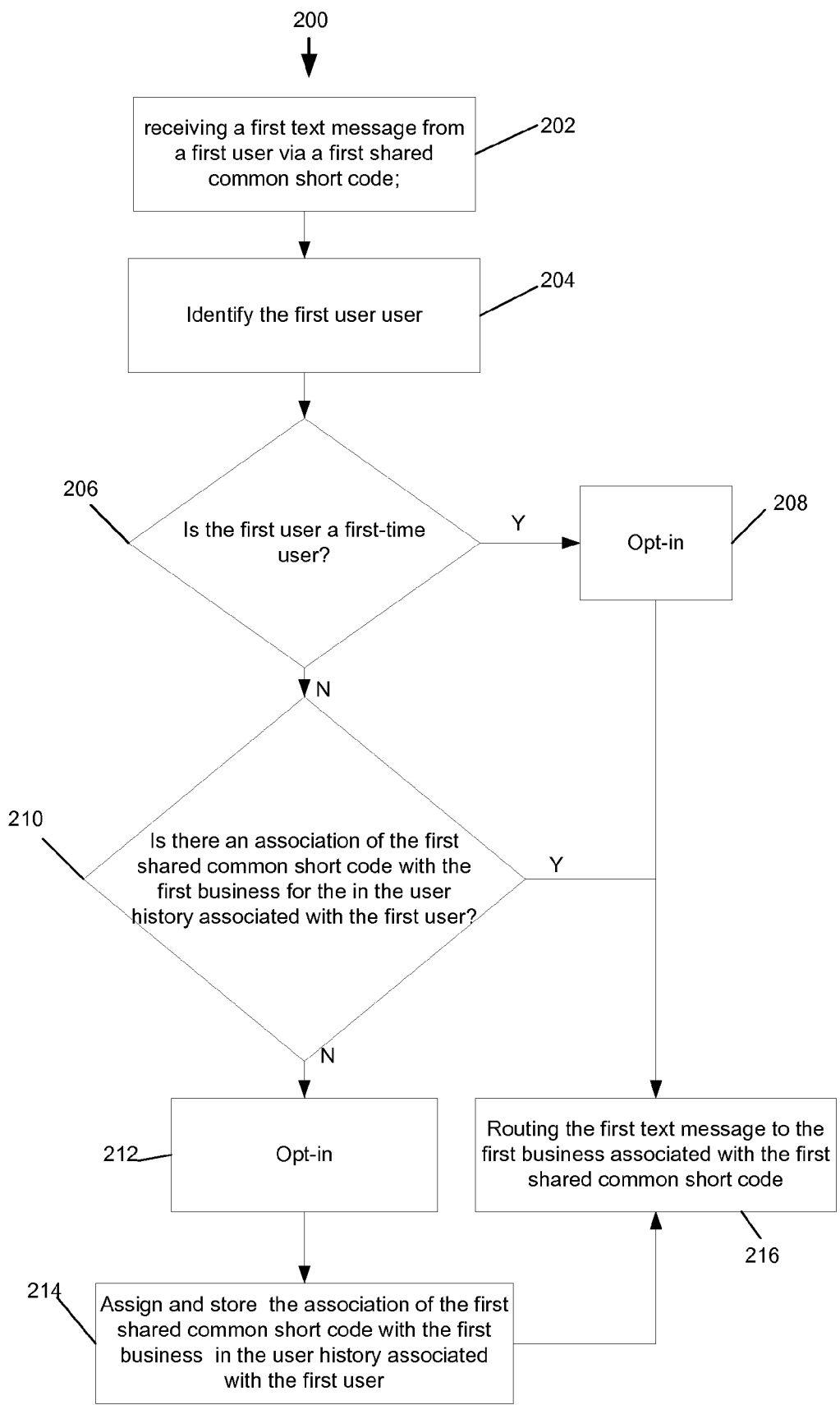
FIG. 2 illustrates a flow diagram for dynamically associating CSCs according to embodiments of the invention.

FIG. 2 illustrates a flow diagram 200 for a method of dynamically associating CSCs according to embodiments of the invention. The method may be implemented in a system illustrated in FIG. 3. A text message is received 202 from a first user via a first shared CSC. The user is identified 204. It is determined if the user is a first time user at 206, the user will be opted-in at 208. The processor 302 may, among other things, receive the text message, identify the user, determine the user's status, and implement the opt-in process. Methods of determining a user's opt-in status are illustrated in FIG. 5B and FIG. 5C, for example.

If the user is not a first time user, it will be determined if there is already an existing association between the user and the intended business for the CSC used by the user at 210. If there is a previous association, it would be stored in the user's history, and the text message will be routed to the business based on the user's history 216. The user histories of all the users may be stored in database 304. If there is no previous association, the user will be opted-in to the business in 212. The intended business may be determined by a keyword in the text message. A method of checking for keywords is illustrated in FIG. 5D according to embodiments of the invention. Keywords may be for, but are not limited to, opting-in and opting-out.

The CSC will then be assigned to the business for the user and stored in the user's history 214. The shared assignable CSC group may be stored in database 306. When the CSC has been dynamically assigned to the user, the text message is routed to the intended business 216.

Figure 3:
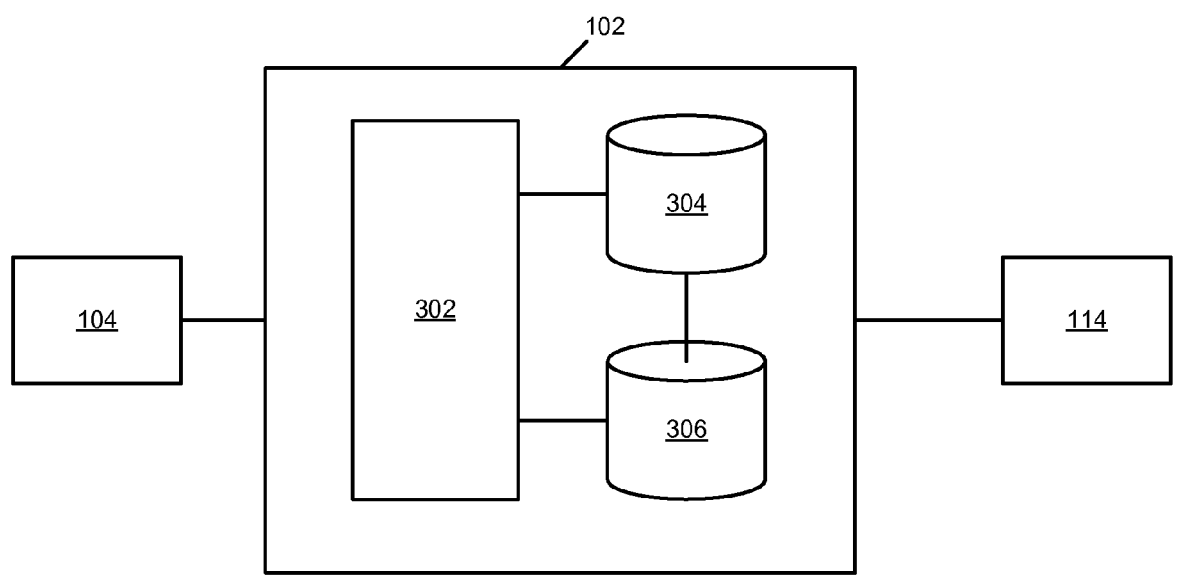
FIG. 3 illustrates a system for associating CSCs to a business for a user according to embodiments of the invention.

As illustrated in FIG. 3, the assignable CSC group may be stored in database 306. The user histories of users of the CSC system 102 may be stored in database 304. A processor 302 determines reception and routing of the text messages based on the data stored in 304 and 306, for example.

Figure 4:
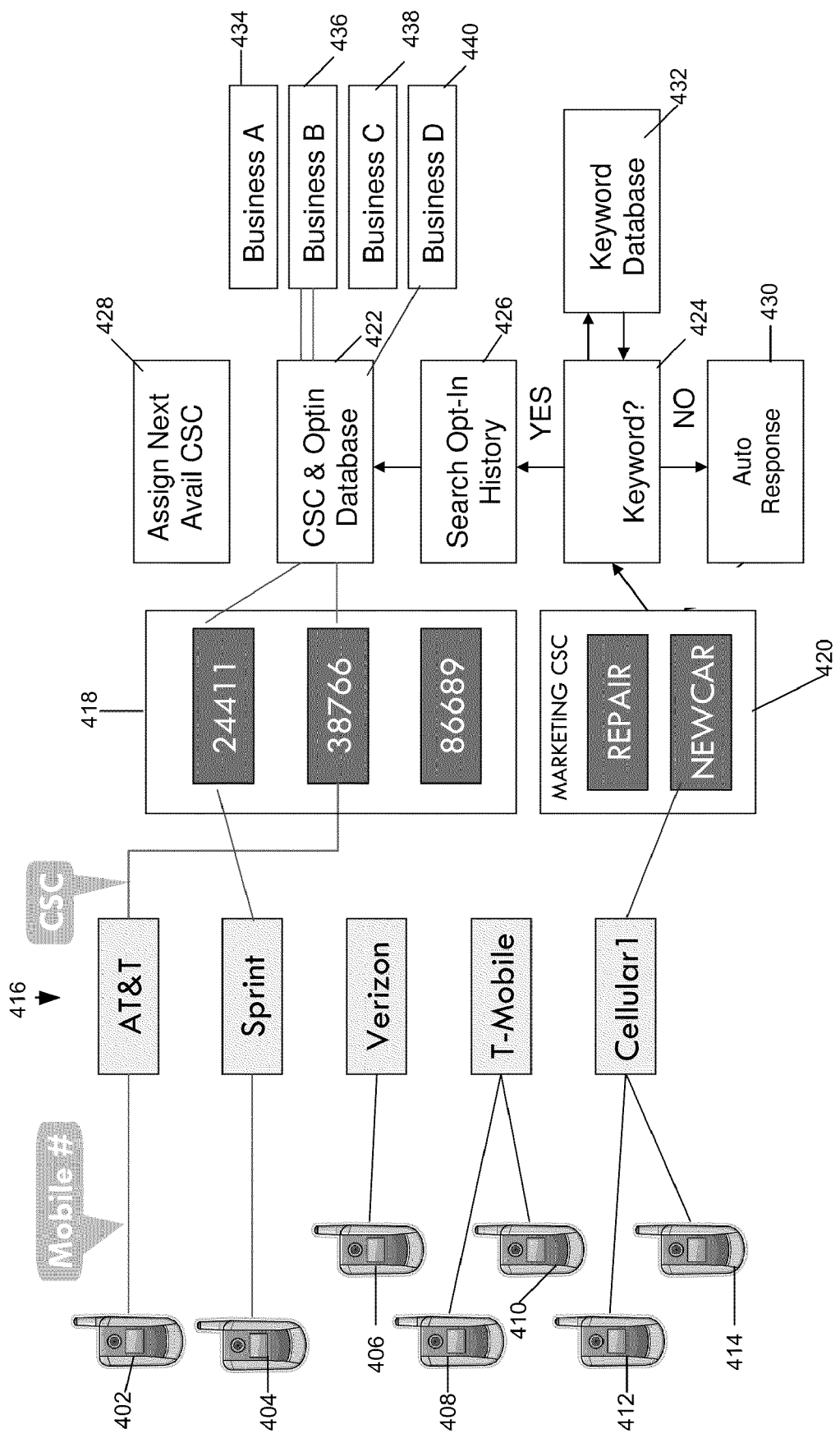
FIG. 4 illustrates dynamically assigning a CSC according to embodiments of the invention.

With reference to FIG. 4, examples of dynamically assigning a CSC may be illustrated according to embodiments of the invention.

A plurality of mobile subscribers may use a plurality of different mobile network carriers 416. A user 402 sends a text message via its carrier using a shared CSC 38766. The intended business for the text message of user 402 is business 436. The user history of user 402 is checked and it is determined that CSC 38766 for user 402 is associated with business 436. Accordingly, the text message of user 402 is routed to business 436.

User 404 also sends a text message to business 436. User 404, using a different mobile network carrier than user 402, sends a text message using a shared CSC 24411. For user 404, the CSC 24411 is associated with business 436, which is stored in the user history for user 404. Accordingly, the text message of user 404 is routed to business 436.

User 412 may send a text message intended for business 440. User 412 sends his text message using a marketing CSC "NEW CAR." The text message includes the word "Audi." It is determined at 424 if the word "Audi" is a keyword by looking up the word "Audi" in a keyword database 432. The opt-in status of user 412 is determined at 426 and the user history of user 412 is accessed at 422. Accordingly, the text message of user 412 is routed to business 440, which may be an Audi dealership, for example.

There are a plurality of methods for opting-in. A business may also opt-in users over the Internet using a form on a webpage or embedded in an email, where the user is provided information on opting-in to the businesss. When a user opts-in, the mobile phone number of the user will be stored as an opted-in user of the business.

When a user opts-in to a first business, either by sending in the opt-in keyword or completing and submitting a web-based form, they are assigned a CSC from the assignable CSC group to be their exclusive channel of communication between that user/mobile phone number, and the business. The CSC assigned for the first business will not be presently assigned to another business for the user. Subsequently, when the user opts-in to a second business, a second, unassigned CSC from the assignable CSC group is assigned to be the exclusive channel of communication between the user and the second business. This method of assigning presently unassigned CSCs from the assignable CSC group continues each time the user opts-in to another business using the application.

In embodiments of the invention, the assignable CSCs may be shared by businesses from any industry. For example, a user opts-in to an auto retailer by sending a Keyword to 639227 (NEWCAR) and is assigned the first available CSC in the assignable CSC group. The same user sees a home for sale and sends a Keyword to 46637 (HOMES) and is assigned the second available CSC in the assignable CSC group.

According to embodiments of the invention, each business may have users using a plurality of different CSCs from the assignable CSC group. However, no single user needs to be assigned more than one CSC for communication with the business. On the other hand, according to embodiments of the invention, a user communicating with multiple departments within the business may have a separate CSC assigned to each department within the business to allow for quick and direct routing of text messages. The business does not need to keep track of which users are assigned to which CSCs. Embodiments of the invention allow the business to automatically interact with any or all of their users without knowing or designating the CSCs used.

When a user decides to no longer receive or send text messages to a business, the user may opt-out from the business. Then, the CSC previously assigned to the opted-out business is again available and may be assigned back to the user when the user chooses to opt-in to another business.

Keywords can generate automated SMS responses sent back to mobile devices. Keywords can also initiate an automated opt-in to receive ongoing communications from a business, making the mobile device a user of the business.

FIG. 5A illustrates a flow diagram of a keyword opt-in process according to embodiments of the invention. When a text message includes a keyword 502, a record is stored indicated the new user as a guest 504 of a business. The user, that is now the guest of the business, is sent an opt-in message 508. The opt-in message gives the business permissions to exchange text messages with that particular user. The text message is also checked for help related keywords 510 (FIG. 5D).

FIG. 5B illustrates a method of sending an opt-in text message according to embodiments of the invention. A text message is sent to a user to confirm they would like to opt-in 522. In other words, the text message confirms that the user is giving the business permission to send text messages.

FIG. 5C illustrates a method of checking opt-in status according to embodiments of the invention. It is determined if the user has already completed the opt-in process at 532. If the user has already opted-in, then an alert is sent to the user to notify the user that they have opted to receive text messages 534.

FIG. 5D illustrates the method of handling a keyword according to embodiments of the invention. Decision 542 checks if an opt-in keyword is included in a text message. If yes, then the text message received from the user is checked for an inclusion an indication of an affirmative response, such as "k", "ok", or "yes" 544, for example, then the user's opt-in status is changed to opt-in 546. Then, an opted-in text message is sent to the user 548.

Decision 550 checks if an opt-out keyword is included in a text message. If yes, then the text message received from the user is checked for an indication of a negative response, such as "stop", "unsubscribe", "end", "quit", or "cancel" 552, for example, then the user's opt-in status is changed to opt-out 554. Then, an opted-out text message is sent to the user 556.

Decision 558 checks if a help keyword is included in a text message. If yes, the text message is checked for inclusion of an indication of help 560. If yes, a help text message is sent to the user 562.

Within a business there is at least one, but possibly an unlimited number of employees sending SMS communications, or text messages, to users. Each of these employees is differentiated in the system using a generic username and they are authenticated using a password. Employees are created, deleted, and given privileges from a special user known as an Administrator.

Figure 6:
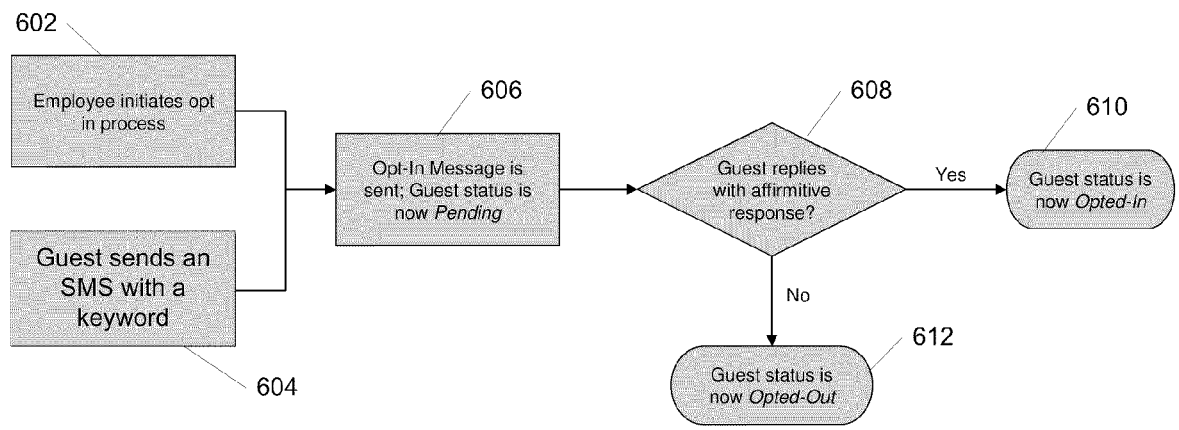
FIG. 6 illustrates a flowchart of an opt-in process according to embodiments of the invention.

According to embodiments of the invention, FIG. 6 illustrates the method of an opt-in method initiated by an employee 602 or by a user sending a text message including a keyword 604. Both of these may initiate an opt-in message 606. The user responds to the opt-in message in 608. If the user responds with an affirmative response, then the status of the user is now "opted-in." However, if the user responds with a negative response, then the status of the user is "opted-out."

While aspects of the invention, including the above described systems and methods, are described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic, and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 7:
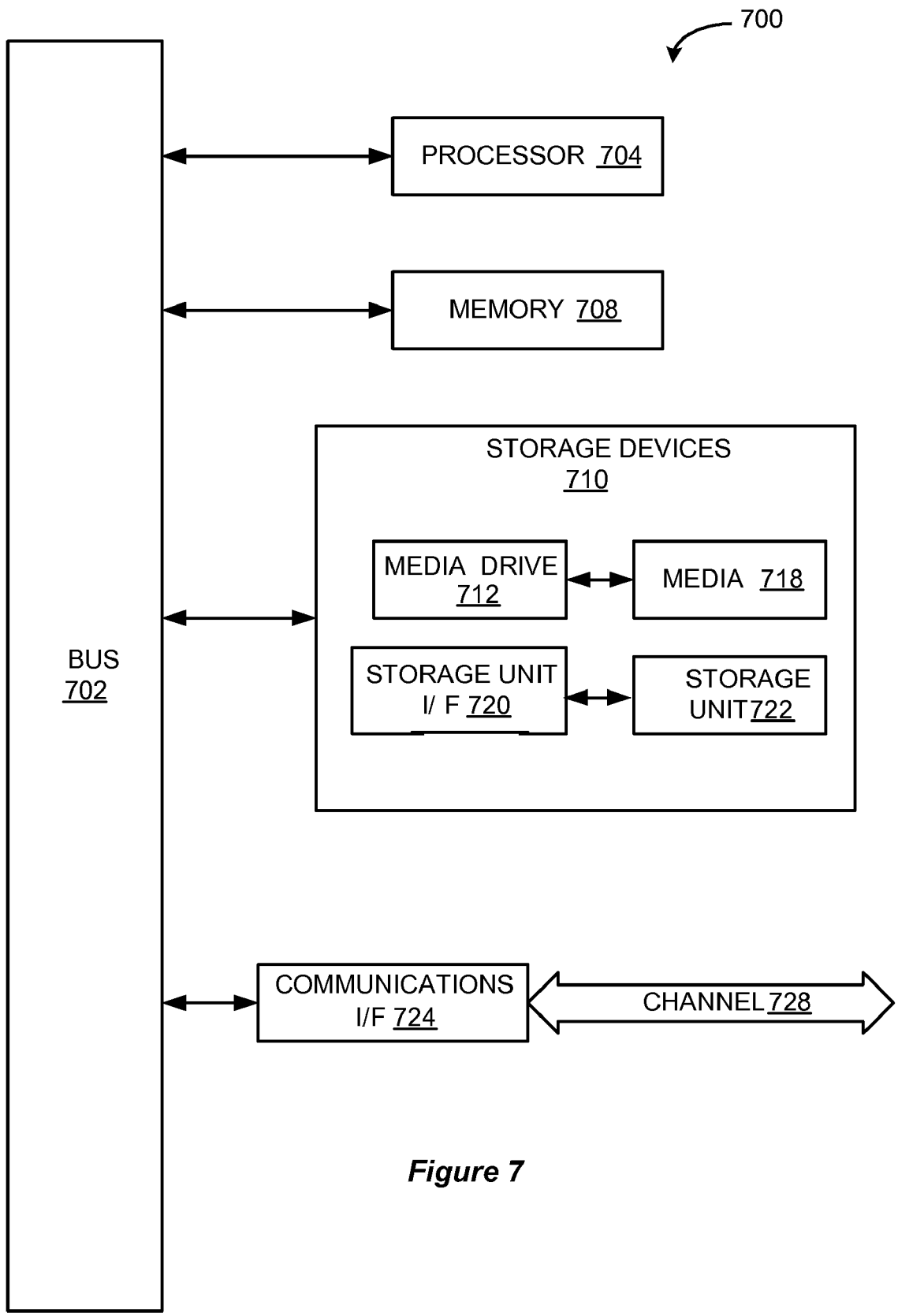
FIG. 7 illustrates a typical computing system that may be employed to implement processing functionality according to embodiments of the invention.

FIG. 7 illustrates an exemplary computing system 700 that may be employed to implement processing functionality for various aspects of the invention (e.g., as a server device, client device, database, combinations thereof, and so on). Those skilled in the relevant art will also recognize how to implement the invention using other computer systems or architectures. Computing system 700 may represent, for example, a desktop, mainframe, server, client, or any other type of special or general purpose computing device as may be desirable or appropriate for a given application or environment. Computing system 700 can include one or more processors, such as a processor 704. Processor 704 can be implemented using a general or special purpose processing engine such as, for example, a microprocessor, microcontroller or other control logic. In this example, processor 704 is connected to a bus 702 or other communication medium.

Computing system 700 can also include a main memory 708, for example random access memory (RAM) or other dynamic memory, for storing information and instructions to be executed by processor 704. Main memory 708 also may be used for storing temporary variables or other intermediate information during execution of instructions to be executed by processor 704. Computing system 700 may likewise include a read only memory ("ROM") or other static storage device coupled to bus 702 for storing static information and instructions for processor 704.

The computing system 700 may also include information storage mechanism 710, which may include, for example, a media drive 712 and a removable storage interface 720. The media drive 712 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 718 may include, for example, a hard disk, floppy disk, magnetic tape, optical disk, CD or DVD, or other fixed or removable medium that is read by and written to by media drive 714. As these examples illustrate, the storage media 718 may include a computer-readable storage medium having stored therein particular computer software or data.

In alternative embodiments, information storage mechanism 710 may include other similar instrumentalities for allowing computer programs or other instructions or data to be loaded into computing system 700. Such instrumentalities may include, for example, a removable storage unit 722 and an interface 720, such as a program cartridge and cartridge interface, a removable memory (for example, a flash memory or other removable memory module) and memory slot, and other removable storage units 722 and interfaces 720 that allow software and data to be transferred from the removable storage unit 718 to computing system 700.

Computing system 700 can also include a communications interface 724. Communications interface 724 can be used to allow software and data to be transferred between computing system 700 and external devices. Examples of communications interface 424 can include a modem, a network interface (such as an Ethernet or other NIC card), a communications port (such as for example, a USB port), a PCMCIA slot and card, etc. Software and data transferred via communications interface 724 are in the form of signals which can be electronic, electromagnetic, optical, or other signals capable of being received by communications interface 724. These signals are provided to communications interface 724 via a channel 728. This channel 728 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product" and "computer-readable medium" may be used generally to refer to media such as, for example, memory 708, storage device 718, storage unit 722, or signal(s) on channel 728. These and other forms of computer-readable media may be involved in providing one or more sequences of one or more instructions to processor 704 for execution. Such instructions, generally referred to as "computer program code" (which may be grouped in the form of computer programs or other groupings), when executed, enable the computing system 700 to perform features or functions of embodiments of the present invention.

In an embodiment where the elements are implemented using software, the software may be stored in a computer-readable medium and loaded into computing system 700 using, for example, removable storage drive 714, drive 712 or communications interface 724. The control logic (in this example, software instructions or computer program code), when executed by the processor 704, causes the processor 704 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention. Moreover, aspects of the invention describe in connection with an embodiment may stand alone as an invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. A non-transitory computer-readable medium encoded with executable instructions for dynamically associating a first user to a first business via a shared common short code in a text messaging service, the instructions comprising instructions for:
   receiving a first text message from a first user via a first shared common short code;
   determining a user history associated with the first user based on an identification of the first user;
   determining an association of the first shared common short code with a first business based on the user history associated with the first user;
   storing the association of the first shared common short code with the first business in the user history associated with the first user; and
   routing the first text message to the first business using the association of the first shared common short code with the first business, wherein the first shared common short code is shared by a plurality of businesses.

2. The computer-readable medium of claim 1, wherein the instructions further comprise instructions for:
   receiving a second text message from a second user via the first shared common short code;
   determining a user history associated with the second user based on an identification of the second user;
   determining an association of the first shared common short code with a second business based on the user history associated with the second user;
   storing the association of the first shared common short code with the second business in the user history associated with the second user; and
   routing the second text message to the second business using the association of the first shared common short code with the second business.

3. The computer-readable medium of claim 1, wherein the instructions further comprise instructions for:
   receiving a second text message from a second user via a second shared common short code;
   determining a user history associated with the second user based an identification of the second user;
   determining as association of the second shared common short code with the first business based on the user history associated with the second user;
   storing the association of the second shared common short code with the first business for the second user in the user history associated with the second user; and
   routing the second text message to the first business using the association of the second shared common short code with the first business.

4. The computer-readable medium of claim 1, wherein the instructions further comprise instructions for:
   determining an opt-in intent of the first user for the first business based a keyword in the first text message; and
   storing the opt-in intent of the first user for the first business in the user history of the first user.

5. The computer-readable medium of claim 4, wherein the instructions are further for:

sending a second text message over the first shared common short code to the first user confirming the opt-in to the first business, wherein the second text message provides terms and conditions of the text messaging service.

6. The computer-readable medium of claim 4, wherein determining the opt-in intent of the user includes receiving an electronic data submission.

7. The computer-readable medium of claim 4, wherein determining the opt-in intent includes receiving a voice indication from the first user.

8. The computer-readable medium of claim 4, wherein the instructions are further for:
transmitting an opt-in confirmation message to the first user.

9. The computer-readable medium of claim 1, wherein the first text message routed to the first business establishes a text message thread between the first user and the first business to the first user via the first shared common short code.

10. The computer-readable medium of claim 1, wherein the first text message includes a keyword, wherein the keyword initiates an automated response from the first business.

11. The computer-readable medium of claim 1, wherein the first text message includes a keyword, wherein the keyword indicates the intent of the first user to opt-in to the first business.

12. A method for dynamically associating a first user to a first business via a shared common short code in a text messaging service, the method comprising:
receiving a first text message from a first user via a first shared common short code;
determining a user history associated with the first user based on an identification of the first user;
determining an association of the first shared common short code with a first business based on the user history associated with the first user;
storing the association of the first shared common short code with the first business in the user history associated with the first user; and
routing the first text message to the first business using the association of the first shared common short code with the first business, wherein the first shared common short code is shared by a plurality of businesses.

13. The method of claim 12, further comprising:
receiving a second text message from a second user via the first shared common short code;
determining a user history associated with the second user based on an identification of the second user;
determining an association of the first shared common short code with a second business based on the user history associated with the second user;
storing the association of the first shared common short code with the second business in the user history associated with the second user; and
routing the second text message to the second business using the association of the first shared common short code with the second business.

14. The method of claim 12, further comprising:
receiving a second text message from a second user via a second shared common short code;
determining a user history associated with the second user based an identification of the second user;
determining an association of the second shared common short code with the first business based on the user history associated with the second user;
storing the association of the second shared common short code with the first business for the second user in the user history associated with the second user; and
routing the second text message to the first business using the association of the second shared common short code with the first business.

15. The method of claim 12, further comprising:
determining an opt-in intent of the first user for the first business based a keyword in the first text message; and
storing the opt-in intent of the first user for the first business in the user history of the first user.

16. The method of claim 15, further comprising:
sending a second text message over the first shared common short code to the first user confirming the opt-in to the first business, wherein the second text message provides terms and conditions of the text messaging service.

17. The method of claim 15, wherein determining the opt-in intent of the user includes receiving an electronic data submission.

18. The method of claim 15, wherein determining the opt-in intent includes receiving a voice indication from the first user.

19. The method of claim 15, further comprising:
transmitting an opt-in confirmation message to the first user.

20. The method of claim 12, wherein the first text message routed to the first business establishes a text message thread between the first user and the first business to the first user via the first shared common short code.

21. The method of claim 12, wherein the first text message includes a keyword, wherein the keyword initiates an automated response from one business.

22. The method of claim 12, wherein the first text message includes a keyword, wherein the keyword indicates the intent of the first user to opt-in to the first business.

23. A system for dynamically associating a first user to a first business via a shared common short code, the system comprising:
logic for receiving a first text message from a first user via a first shared common short code;
a processor for determining a user history associated with the first user based on an identification of the first user, and determining an association of the first shared common short code with a first business based on the user history associated with the first user;
a memory for storing the association of the first shared common short code with the first business in the user history associated with the first user; and
logic for transmitting the first text message to the first business using the association of the first shared common short code with the first business, wherein the first shared common short code is shared by shared by a plurality of businesses.

24. The system of claim 23, wherein
the processor is further for:
receiving a second text message from a second user via the first shared common short code,
determining a user history associated with the second user based on an identification of the second user,
determining an association of the first shared common short code with a second business based on the user history associated with the second user, and
routing the second text message to the second business using the association of the first shared common short code with the second business, and
wherein the memory is further for:
storing the association of the first shared common short code with the second business in the user history associated with the second user.

25. The system of claim 23, wherein the second text message is received from a second user via a second shared common short code.

26. The system of claim 23, wherein the processor is further for determining an opt-in intent of the first user for the first business based a keyword in the first text message, and the memory is further for storing the opt-in intent of the first user for the first business in the user history of the first user.

27. The method of claim 26, wherein the processor is further for sending a second text message over the first shared common short code to the first user confirming the opt-in to the first business, wherein the second text message provides terms and conditions of the text messaging service.

28. The method of claim 26, further comprising logic for communicating an opt-in confirmation message to the first user.

* * * * *